Patented May 20, 1924.

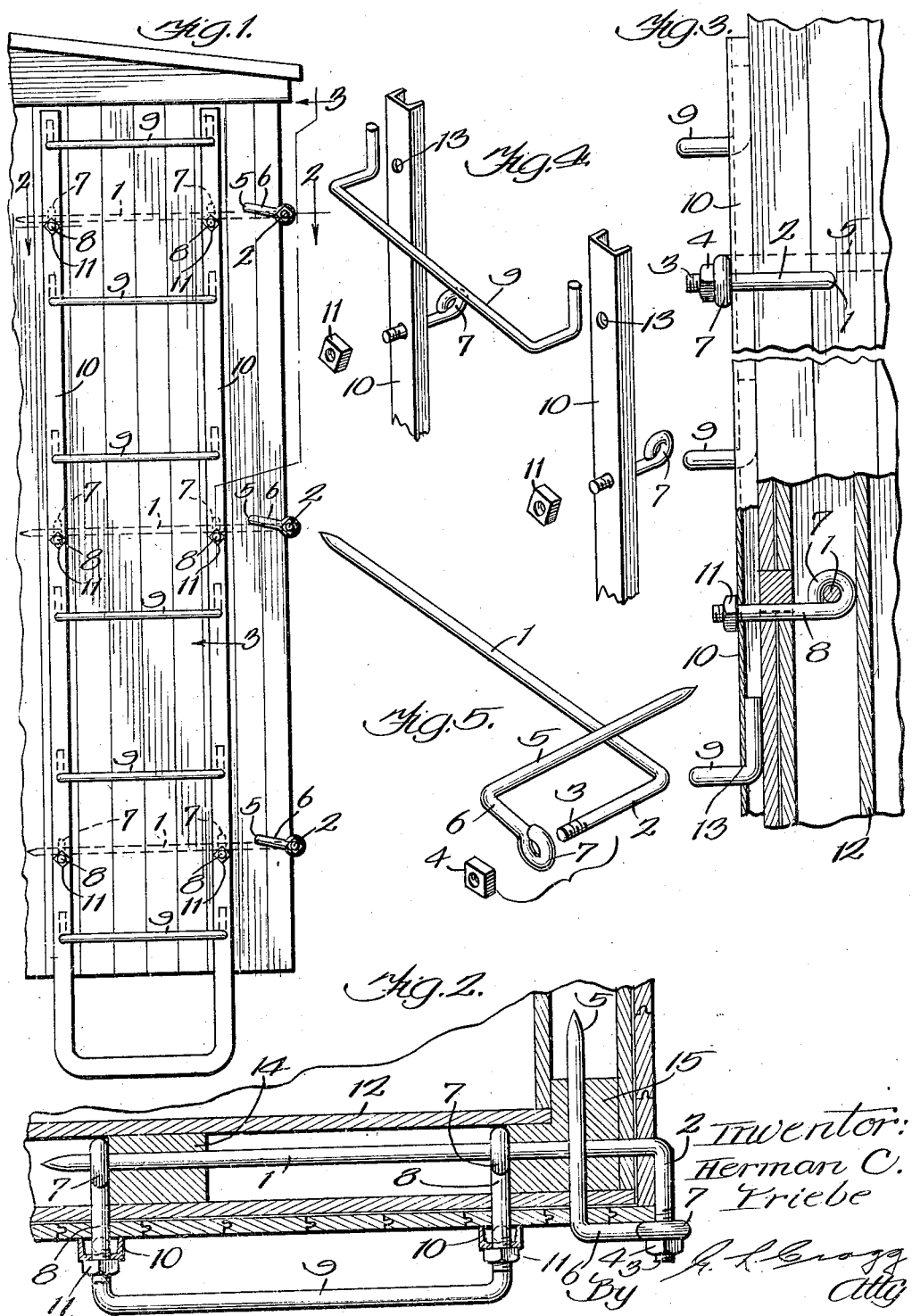

1,495,043

UNITED STATES PATENT OFFICE.

HERMAN C. PRIEBE, OF BLUE ISLAND, ILLINOIS.

BOLT STRUCTURE.

Application filed December 21, 1923. Serial No. 682,123.

*To all whom it may concern:*

Be it known that I, HERMAN C. PRIEBE, a citizen of the United States, residing at Blue Island, in the county of Cook and State of Illinois, have invented a certain new and useful Improvement in Bolt Structures, of which the following is a full, clear, concise, and exact description.

My invention relates to bolt structures and has for its general object the provision of an improved interrelation of bolts enabling their assemblage in pairs in a manner to enable each bolt of a pair to obstruct the movement of the other along its shank. To this end, each bolt has a head thereon, the bolts being arranged to have the shanks thereof angularly related at their heads, and the bolt heads interengaging for the purpose stated.

In the preferred embodiment of the invention the head upon one of the bolts is in the form of an eye that receives the shank of the other bolt, and the head of the other bolt is adjustable along its shank, being preferably in the form of a nut threaded on its shank.

By bending the shanks of the bolts, the sections thereof that are more removed from the bolt heads may extend in crossing directions with crossed portions of the bolt shanks received in the same body, such as the side of a freight car, the bolts and the body receiving the same cooperating to maintain these elements in assembly.

The structure of my invention may be employed for mounting the rungs of ladders or handles upon freight cars, and when the invention is thus employed, the shank of one bolt of each pair holds anchoring bolts that are suitably assembled with the corresponding rung.

My invention enables the mounting of ladders or rungs upon refrigerator cars without the necessity of penetrating the inner walls of such cars, an advantage which will be appreciated by those skilled in the art.

The invention will be more fully explained in connection with the accompanying drawing in which Fig. 1 is a view in elevation of a corner portion of a freight car having a ladder assembled therewith in accordance with my invention; Fig. 2 is a sectional view on line 2—2 of Fig. 1, on a larger scale; Fig. 3 is a sectional view on line 3—3 of Fig. 1, on a larger scale; Fig. 4 illustrates a ladder structure which may be assembled with a car body by means of my invention; and Fig. 5 illustrates the bolt structure of my invention with its parts in separated relation.

Like parts are indicated by similar characters of reference throughout the different figures.

One bolt of each pair has its shank bent into adjacent angularly related sections 1 and 2 and is formed with threads, as indicated at 3, to receive the nut 4 that constitutes an adjustable head for this bolt.

The complemental bolt has a shank bent into angularly related adjacent sections 5 and 6 and has a head in the form of an eye 7 which receives the threaded shank portion 2 of the other bolt. These bolts may be assembled with their outer sections 1 and 5 extending in crossing directions, these bolt sections actually crossing, in the preferred embodiment of the invention.

If the bolt structure of my invention is to be employed in assembling the ladder rungs or handle rungs with a freight car, the bolt shank section 1 is passed through the eyes or heads 7 of anchoring bolts 8 that are employed to assemble the rungs with the car. Where these rungs are in the form of ladder rungs 9 suitably assembled with ladder rails 10, the anchoring bolts are preferably threaded at the outer ends of their shanks to receive clamping nuts 11 which cooperate with the anchoring bolts and the bolt shank portions 1 in clamping the ladder rails against the car. The anchoring bolts need not penetrate the inner wall 12 of the car when the bolt structure of my invention is employed, an advantage which is important if the car is a refrigerator car. The ladder rungs or handle rungs may be of any suitable shape. In the embodiment of the invention illustrated they are in the form of rods bent as shown in Fig. 4 to have their ends receivable through openings 13 in the ladder rails, desirably made of channel iron.

When the parts are assembled as described they have the relationship clearly illustrated in the drawing, and particularly in Fig. 2 where I have shown a bolt shank portion 1 passing through the timbers 14 and 15 that are disposed between the inner and outer walls of the car and with the bolt shank portion 5 passing through the timber 15 crosswise of the complemental shank portion 1. The bolt head 4 is firmly screwed against eye 7 and these portions 4 and 7 of the bolts cooperate with the car body and with each other to hold the bolts in rigid relation with each other and with the car body, thereby to assure rigid assemblage of the anchoring bolts with the car body and with the parts anchored thereby.

It is obvious that changes may be made without changing the spirit of my invention.

Having thus described my invention I claim as new and desire to secure by Letters Patent the following:—

1. The combination with a bolt having a head thereon; of a second bolt also having a head, the shanks of said bolts being angularly related at their heads, the heads of said bolts interengaging to obstruct movement of either of the angularly related shank portions along the other; and an anchoring bolt having a head laterally engaging a portion of the shank of one of said bolts, this shank portion being angular to the portion of this shank that is adjacent the head of this bolt.

2. The combination with a bolt having a head thereon; of a second bolt whose shank is laterally engaged by the head of the first bolt and having a head laterally engaging the first bolt; and an anchoring bolt having a head laterally engaging a portion of the shank of one of said bolts, this shank portion being angular to the portion of this shank that is adjacent the head of this bolt.

3. The combination with a bolt having a head thereon in the form of an eye; of a second bolt whose shank passes through said eye to have its movement with respect to the first bolt obstructed, and having a head that engages said eye to obstruct the movement of the first bolt with respect to the second; and an anchoring bolt having a head laterally engaging a portion of the shank of one of said bolts, this shank portion being angular to the portion of this shank that is adjacent the head of this bolt.

4. The combination with a bolt having a head thereon; of a second bolt also having a head in the form of a nut threaded thereon, the shanks of said bolts being angularly related at their heads, the heads of said bolts interengaging to obstruct movement of either of the angularly related shank portions along the other; and an anchoring bolt having a head laterally engaging a portion of the shank of one of said bolts, this shank portion being angular to the portion of this shank that is adjacent the head of this bolt.

5. The combination with a bolt having a head thereon; of a second bolt whose shank is laterally engaged by the head of the first bolt and having a head in the form of a nut threaded thereon which laterally engages the first bolt; and an anchoring bolt having a head laterally engaging a portion of the shank of one of said bolts, this shank portion being angular to the portion of this shank that is adjacent the head of this bolt.

6. The combination with a bolt having a head thereon in the form of an eye; of a second bolt whose shank passes through said eye to have its movement with respect to the first bolt obstructed, and having a head in the form of a nut threaded thereon that engages said eye to obstruct the movement of the first bolt with respect to the second; and an anchoring bolt having a head laterally engaging a portion of the shank of one of said bolts, this shank portion being angular to the portion of this shank that is adjacent the head of this bolt.

7. The combination with a bolt having a head thereon; of a second bolt also having a head, the shanks of said bolts being angularly related at their heads, the heads of said bolts interengaging to obstruct movement of either of the angularly related shank portions along the other; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of the shank that is adjacent the head of this bolt.

8. The combination with a bolt having a head thereon; of a second bolt whose shank is laterally engaged by the head of the first bolt and having a head laterally engaging the first bolt; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt.

9. The combination with a bolt having a head thereon in the form of an eye; of a second bolt whose shank passes through said eye to have its movement with respect to the first bolt obstructed, and having a head that engages said eye to obstruct the movement of the first bolt with respect to the second; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt.

10. The combination with a bolt having a head thereon; of a second bolt also having a head in the form of a nut threaded thereon, the shanks of said bolts being angularly related at their heads, the heads of said bolts interengaging to obstruct movement of either of the angularly related shank portions along the other; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt.

11. The combination with a bolt having a head thereon; of a second bolt whose shank is laterally engaged by the head of the first bolt and having a head in the form of a nut threaded thereon which laterally engages the first bolt; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt.

12. The combination with a bolt having a head thereon in the form of an eye; of a second bolt whose shank passes through said eye to have its movement with respect to the first bolt obstructed, and having a head in the form of a nut threaded thereon that engages said eye to obstruct the movement of the first bolt with respect to the second; an anchoring bolt having a head laterally engaging a portion of the shank of one of said bolts, this shank portion being annular to the portion of this shank that is adjacent the head of this bolt; and an anchoring bolt having an eye receiving a portion of the shank of one of said bolts, this shank portion being angular to the portion of this shank that is adjacent the head of this bolt.

13. The combination with a bolt having a head thereon; of a second bolt also having a head, the shanks of said bolts being angularly related at their heads, the heads of said bolts interengaging to obstruct movement of either of the angularly related shank portions along the other; and an anchoring bolt having a head laterally engaging a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

14. The combination with a bolt having a head thereon; of a second bolt whose shank is laterally engaged by the head of the first bolt and having a head laterally engaging the first bolt; and an anchoring bolt having a head laterally engaging a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

15. The combination with a bolt having a head thereon in the form of an eye; of a second bolt whose shank passes through said eye to have its movement with respect to the first bolt obstructed, and having a head that engages said eye to obstruct the movement of the first bolt with respect to the second; and an anchoring bolt having a head laterally engaging a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

16. The combination with a bolt having a head thereon; of a second bolt also having a head in the form of a nut threaded thereon, the shanks of said bolts being angularly related at their heads, the heads of said bolts interengaging to obstruct movement of either of the angularly related shank portions along the other; and an anchoring bolt having a head laterally engaging a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

17. The combination with a bolt having a head thereon; of a second bolt whose shank is laterally engaged by the head of the first bolt and having a head in the form of a nut threaded thereon which laterally engages the first bolt; and an anchoring bolt having a head laterally engaging a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

18. The combination with a bolt having a head thereon in the form of an eye; of a second bolt whose shank passes through said eye to have its movement with respect to the first bolt obstructed, and having a head in the form of a nut threaded thereon that engages said eye to obstruct the movement of the first bolt with respect to the second; and an anchoring bolt having a head laterally engaging a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

19. The combination with a bolt having a head thereon; of a second bolt also having a head, the shanks of said bolts being angularly related at their heads, the heads of said bolts interengaging to obstruct movement of either of the angularly related shank portions along the other; an anchoring bolt having a head laterally engaging a portion of the shank of one of said bolts, this shank portion being angular to the portion of this shank that is adjacent the head of this bolt; and an achoring bolt having an eye receiving a portion of the shank of one of said bolts, this shank portion being angular to the portion of the shank that is adjacent the head of this bolt, the other bolt also having a portion of its shank angular to the shank portion adjacent its head and extending in a direction that crosses the aforesaid angular shank portion of the other bolt.

20. The combination with a bolt having a head thereon; of a second bolt whose shank is laterally engaged by the head of the first bolt and having a head laterally engaging the first bolt; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

21. The combination with a bolt having a head thereon in the form of an eye; of a second bolt whose shank passes through said eye to have its movement with respect to the first bolt obstructed, and having a head that engages said eye to obstruct the movement of the first bolt with respect to the second; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

22. The combination with a bolt having a head thereon; of a second bolt also having a head in the form of a nut threaded thereon, the shanks of said bolts being angularly related at their heads, the heads of said bolts interengaging to obstruct movement of either of the angularly related shank portions along the other; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

23. The combination with a bolt having a head thereon; of a second bolt whose shank is laterally engaged by the head of the first bolt and having a head in the form of a nut threaded thereon which laterally engages the first bolt; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

24. The combination with a bolt having a head thereon in the form of an eye; of a second bolt whose shank passes through said eye to have its movement with respect to the first bolt obstructed, and having a head in the form of a nut threaded thereon that engages said eye to obstruct the movement of the first bolt with respect to the second; an anchoring bolt having a head laterally engaging a portion of the shank of one of said bolts, this shank portion being angular to the portion of this shank that is adjacent the head of this bolt; and an anchoring bolt having an eye receiving a portion of the shank of one of said bolts, this shank portion being angular to the portion of this shank that is adjacent the head of this bolt, the other bolt also having a portion of its shank angular to the shank portion adjacent its head and extending in a direction that crosses the aforesaid angular shank portion of the other bolt.

In witness whereof, I hereunto subscribe my name this 8th day of December, A. D. 1923.

HERMAN C. PRIEBE.